Sept. 9, 1952     H. G. McQUISTON     2,609,857
AUXILIARY AIR TANK FOR AUTOMOBILE TIRES
Filed Jan. 20, 1947                  2 SHEETS—SHEET 1

Inventor
Harry G. McQuiston
By
Attorney

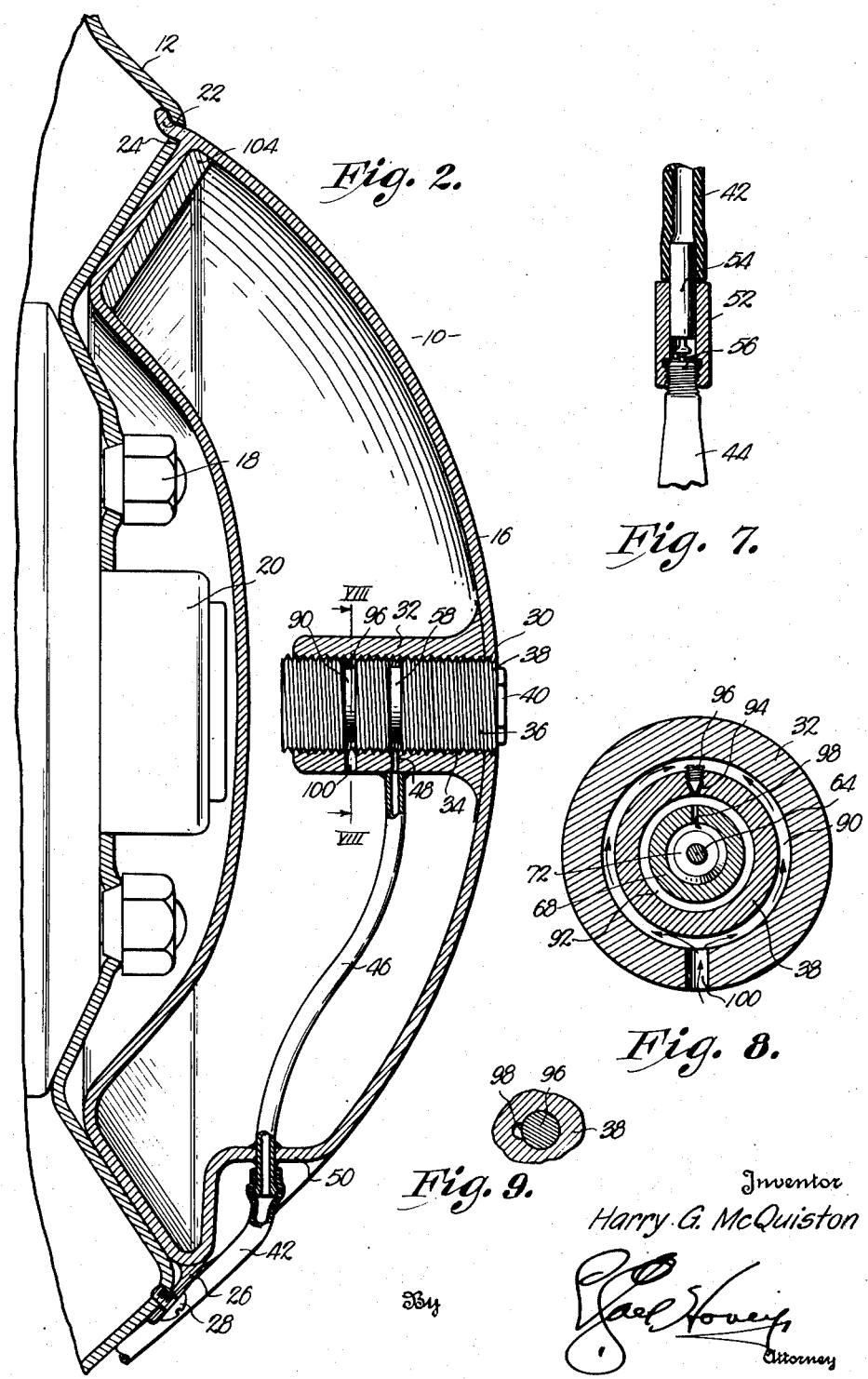

Patented Sept. 9, 1952

2,609,857

UNITED STATES PATENT OFFICE 2,609,857

AUXILIARY AIR TANK FOR AUTOMOBILE TIRES

Harry G. McQuiston, Emporia, Kans.

Application January 20, 1947, Serial No. 723,135

1 Claim. (Cl. 152—418)

This invention relates generally to means for inflating automobile tires, and more specifically to an auxiliary air tank having parts for automatically maintaining the tire inflated at any desired degree of pressure.

The primary aim of this invention is to provide an auxiliary air tank for automobile tires that is simple and compact, that may readily be made a part of the hub-cap of automobiles of modern types without in any way disfiguring the same or affecting its use, and that provides a more accurate regulation of air pressure in the tire.

The most important object of this invention is to provide an auxiliary air tank for automobile tires having means for automatically inflating the tire to a predetermined pressure when the same falls below such pressure level and to automatically deflate the same when such pressure rises beyond said level.

Another important object of this invention is the provision of automatic tire inflating apparatus having means to equalize the constant fluctuating air pressure in the tire as the same moves across rough surfaces before such pressure reaches the mechanism for controlling the ingress and egress thereof to and from the tire.

A further object of this invention is to provide unique structure for maintaining a desired amount of air pressure in an automobile tire having means for automatically compensating for "pounding" resulting from movement of the tire over rough surfaces and causing rapid changes in air pressure, thereby eliminating "flutter" action upon valves regulating flow of air to and from the tire.

Other objects of this invention, particularly with respect to purely structural details, will be made clear or become apparent during the course of the following specification, reference being had to the accompanying drawings, wherein:

Fig. 2 is a fragmentary cross-sectional view taken on line II—II of Fig. 1 and looking in the direction of the arrows.

Fig. 7 is an enlarged detailed view of the conduit interconnecting the auxiliary tank and the tube, showing the same in cross section and illustrating the valve associated with the valve stem valve.

Fig. 8 is a cross-sectional view taken on line VIII—VIII of Fig. 2, looking in the direction of the arrows; and Fig. 9 is an enlarged, detailed sectional view taken on line IX—IX of Fig. 4.

One of the most difficult problems heretofore present in the field of providing means for automatically inflating automobile tires as the same are placed in use, is to have structure to compensate for inaccurate operation due to fluctuation or rapid change in pressure within the tire due to contact thereof with rough surfaces over which the tire travels. Valves for automatically regulating the flow of air pressure from an auxiliary high pressure tank to the tire and additional valves for regulating the egress of air from the tire when an excess amount is present therein due to extreme heat, are all affected in their operation by the extent of blows upon the tire as the same comes in contact with uneven surfaces over which it travels.

Figure 1:
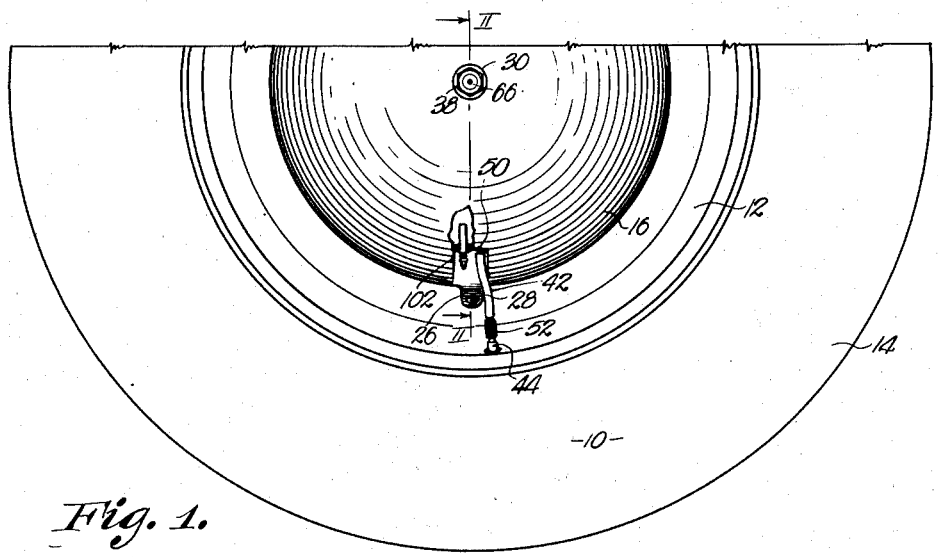
Fig. 1 is a fragmentary side elevational view of an automobile wheel and tire, showing the auxiliary air tank forming a part of my present invention operably associated therewith.
Figure 4:
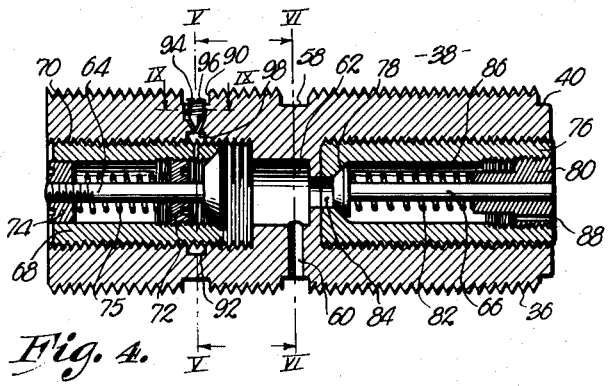
Fig. 4 is a cross-sectional view taken on line IV—IV of Fig. 3.
Figure 3:
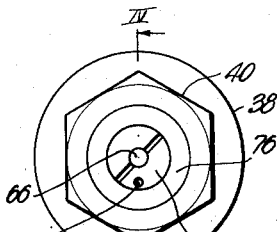
Fig. 3 is the normally outermost end view of the housing unit illustrated in Fig. 4.
Figure 5:
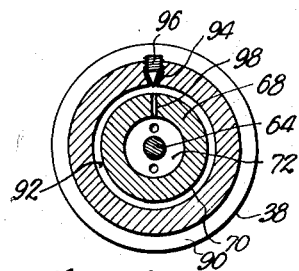
Fig. 5 is a cross-sectional view taken on line V—V of Fig. 4 looking in the direction of the arrows.
Figure 6:
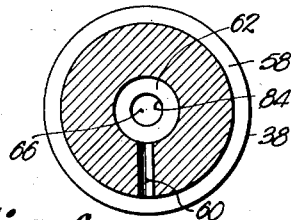
Fig. 6 is a cross-sectional view taken on line VI—VI of Fig. 4, looking in the direction of the arrows.

These problems have all been solved in the apparatus about to be described, and in the drawings, Figs. 1 and 2 illustrate the manner in which the device may be made a part of the conventional hub-cap of modern types of automobile wheels. An automobile wheel illustrated in Fig. 1, is broadly designated by the numeral 10 and constitutes a rim 12, upon which is mounted the usual type of pneumatic tire 14 and having a high pressure auxiliary tank 16. This tank 16 simulates in appearance the conventional type of automobile hub-cap and may well be varied to suit different kinds of wheels, at the same time serve its usual function of protecting the lugs 18 as well as the hub 20 of the automobile.

Tank 16 is hollow and is hermetically sealed to the end that the same will receive air under a relatively high pressure. Consequently, the material from which the walls forming tank 16 are made should be relatively strong and capable of withstanding blows likely to occur when the automobile is placed in use. The usual type of conventional spring means (not shown) serves to hold tank 16 in place upon the rim 12, and as additional security, tank 16 is provided with a hook 22 at one end thereof. This hook is received by opening 24 formed in rim 12 of the wheel 10, and a finger 26 in diametrically opposed relation to the hook 22 receives a screw or the like 28, which is in turn threaded into rim 12.

Extending inwardly from the outermost wall of tank 16 and in register with an opening 30 formed in this outermost wall is a sleeve 32 having internal threads 34 for receiving the external threads 36 of a housing, broadly designated by the numeral 38. This housing 38 has shoulders 40 formed thereon for receiving a tool permitting the removal of housing 38 for purposes more fully hereinafter described. The tube of the tire 14 is placed into communication with the tank 16 through the medium of a flexible tube 42 extending from a point exteriorly of tank 16 to valve stem 44. A pipe 46 having one end thereof joined to sleeve 32 and in communication with a port 48 therein, extends through the wall of tank 16 and joins with tube 42, as is clear in Fig. 2. This connection between pipe 46 and tube 42 is protected against damage by offsetting the outermost wall of tank 16 as at 50. A fitting 52, provided on the free end of the tube 42 for connecting the latter to valve stem 44, is in screw-threaded engagement therewith and a Schrader type valve 54 within this fitting 52 engages with a similar Schrader valve 56 within stem 44 when fitting 52 is in place. Thus, both these valves 54 and 56 remain open while such connection is made.

The housing 38 is provided with a continuous annular groove 58 for placing a port 48 into communication with an opening 60, formed in sleeve 32 and housing 38 respectively. This opening 60 is in turn in register with a chamber 62 in housing 38 intermediate the ends thereof. A pair of reciprocable valves 64 and 66 are provided in housing 38 in opposed relation at opposite sides of the chamber 62. Valve 64 is mounted within an insert 68 in threaded engagement with an internally threaded opening 70 in one end of the housing 38. This insert 68 is provided with a seat on the normally innermost end thereof for the valve 64 and a plug 72 threadably received within the insert 68, has a central opening therethrough for slidably receiving the stem of valve 64. A second plug 74 threaded upon the outermost end of the valve stem of valve 64 is slidable within the insert 68 and a spring 75 interposed between the plugs 72 and 74 tends to normally maintain valve 64 against its seat.

Valve 66 is mounted within an insert 76 in threaded engagement with an opening formed in the opposite end of housing 38, which insert 76 has one end thereof formed to present a seat 78 for valve 66. This valve 66 is freely slidable within a plug 80 threaded into the insert 76 and a spring 82 coiled about the stem of valve 66 between the head thereof and plug 80 tends to hold valve 66 in the normal condition against its seat 78. A passage 84 in housing 38 and insert 76 places the central opening 86 of this insert 76 into communication with central chamber 62 in housing 38. An aperture 88 formed in the plug 80 places passage 86 into communication with the atmosphere externally of tank 16.

A continuous external annular groove 90 is formed in housing 38 in spaced relation to the annular groove 58 therein and this groove 90 is placed into communication with an internal continuous annular groove 92 within housing 38 by an aperture 94. This aperture 94 is formed to present a seat for a needle valve 96 threadably inserted therein. A port 98 of reduced diameter formed in insert 68 connects internal groove 92 with the interior of insert 68 between plug 72 therein and the head of valve 64. The interior of housing 38 is placed in direct communication with the interior of tank 16 when needle valve 96 is open by a port 100 formed in sleeve 32 and in communication with external groove 90 in housing 38.

Assuming all the parts of the aforesaid described device to be formed and operably interconnected as set forth, the operation thereof is as follows. Tank 16 is filled with air under pressure through the medium of a pipe 102, extending into tank 16 and terminating a distance inwardly from the wall thereof and having a suitable check valve therein. This tank 16 is filled to relatively high pressure with respect to the normal pressure to which tire 14 is maintained and as the pressure within the tire 14 falls below a certain value, air within tank 16 will flow into the tube of tire 14 in the following manner:

From tank 16 air flows into passage 100, to groove 90, thence into aperture 94, groove 92, and then through port 98. Such air moving against valve 64, causes this same valve to open whence it then passes into chamber 62, through outlet passage 60, annular groove 58, opening 48, pipe 46, tube 42 and thence open valves 54 and 56, into valve stem 44 and the tube. This operation takes place when the high pressure within tank 16 offsets the pressure within the tube and within chamber 62. After the tube receives a certain amount of air, valve 64 will again close against its seat and prevent further flow. When the air within the tube rises beyond a predetermined value, due to heat or the like, such pressure within the tube and within chamber 62 will open valve 66, whereupon this excess air flows through passage 86 and into aperture 88, where the same is free to pass outwardly to the atmosphere.

It is notable that chamber 62 will compensate for any rapid change or fluctuation of air within the tire 14 as the same passes over rough terrain. Such forces will not readily affect the operation of valve 66 because of the equalizing of the pressure within the chamber 62. Therefore, air loss from the tube due to bumps and other action upon the tire through the valve 66, will be obviated. It is further notable that after the tire is placed in operation, a certain amount of "pounding" will be present, because of rough surfaces, and valve 64 would normally be caused to flutter because of the rapid changes in pressure within the tire 14. Such "pounding" is compensated for by the annular groove 58 and the provision of ports 48 and 60 in opposed relation when the housing 38 is placed within the sleeve 32. Valve 64 will, therefore, remain closed at all times except when the pressure within the tire 14 falls appreciably below the desired value. The tension of both the springs 75 and 82 of valves 64 and 66 respectively is rendered adjustable through the medium of plugs 72, 74 and 80 respectively by moving the same inwardly or outwardly with respect to their inserts 68 and 76.

It is further notable that needle valve 96 may be adjusted by removal of housing 38 from sleeve 32. Such adjustment permits the flow of fluid from tank 16 to the tire 14 at only a relatively small rate, to the end that when valve 64 opens, such air will not flow into tire 14 in excess of that desired. This retardation is further provided for in the reduction in size of port 98. If any flutter should occur in this valve 64, caused, not by a deficiency of air within the tire 14, but by road conditions, the amount of air passing from tank 16 would only be slight.

It is an important feature of this invention, furthermore, that since housing 38 is disposed substantially on the axis of rotation of the tank 16 and since each of the valves 64 and 66 reciprocate in paths of travel transversely to the rotation of the wheel 10, these valves will not be affected by centrifugal force inherent in the wheel 10.

A counterweight 104 within tank 16 is disposed in diametrically opposed relation to pipe 46, tube 42 and valve stem 44 to maintain wheel 10 in balance after the device just described is affixed thereto.

It is clear that the auxiliary air tank just described and its associated parts is extremely efficient and accurate and since many changes and modifications may well be made without departing from the spirit of the invention, it is desired to be limited only by the scope of the appended claim.

Having thus described the invention, what is claimed as new and desired to be secured by Letters Patent is:

In a rotatable wheel having a tire, a tube in the tire provided with an air inlet conduit, and a hollow, perforated hub cap, presenting an air pressure tank, all mounted on the wheel for rotation therewith; a tubular support secured to the hub cap therewithin in register with the perforation thereof and having a first radial opening communicating with the hub cap tank and a second radial opening communicating with the conduit, said conduit extending through the hub cap; an elongated, hollow housing within the support and provided with an outlet port extending to the atmosphere, a first external, annular groove registering with said first opening, a second external, annular groove registering with said second opening, an internal dampening chamber, a radial hole placing the chamber in register with said second external groove, an internal, annular groove, and a radial duct interconnecting the internal groove with said first external groove; a first valve in the housing on one side of said chamber and provided with spring means for yieldably holding the same biased toward a position closing the chamber from said internal groove; and a second valve in the housing, separate from the first valve, on the opposite side of said chamber and provided with spring means for yieldably holding the same biased toward a position closing the chamber from said outlet port, said valves being reciprocable on the longitudinal axis of the housing toward the outlet port against the action of their respective springs to place said chamber into register with the hub cap and with the atmosphere respectively.

HARRY G. McQUISTON.

REFERENCES CITED

The following references are of record in the file of this patent:

UNITED STATES PATENTS

| Number | Name | Date |
| --- | --- | --- |
| Re. 12,411 | Temple | Nov. 21, 1905 |
| 1,128,455 | Keith | Feb. 16, 1915 |
| 1,233,885 | Kuenhold | July 17, 1917 |
| 2,141,542 | Mann | Dec. 27, 1938 |
| 2,141,543 | Mann (II) | Dec. 27, 1938 |

FOREIGN PATENTS

| Number | Country | Date |
| --- | --- | --- |
| 1,669 | Great Britain | 1897 |